(12) United States Patent
Torres San Juan et al.

(10) Patent No.: US 10,834,928 B2
(45) Date of Patent: *Nov. 17, 2020

(54) BLOOM RESISTANT FROZEN BAKERY PRODUCTS

(71) Applicant: DAWN FOOD PRODUCTS, INC., Jackson, MI (US)

(72) Inventors: Julio Alberto Torres San Juan, Denver, CO (US); Jane L. Kutner, Denver, CO (US); Juan Gabriel Gonzalez Juarez, Guadalupe (MX); Rolando Jesus Alanis Villarreal, Guadalupe (MX); Miles Elton Jones, Clarklake, MI (US)

(73) Assignee: DAWN FOOD PRODUCTS, INC., Jackson, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,546

(22) Filed: Oct. 1, 2019

(65) Prior Publication Data

US 2020/0029582 A1 Jan. 30, 2020

Related U.S. Application Data

(63) Continuation of application No. 14/423,324, filed as application No. PCT/US2013/056087 on Aug. 22, 2013, now Pat. No. 10,440,965.

(60) Provisional application No. 61/692,483, filed on Aug. 23, 2012.

(51) Int. Cl.
| | | |
|---|---|---|
| *A21D 15/02* | (2006.01) | |
| *A23G 3/54* | (2006.01) | |
| *A21D 13/60* | (2017.01) | |
| *A21D 13/28* | (2017.01) | |
| *A21D 13/24* | (2017.01) | |
| *A23G 3/34* | (2006.01) | |

(52) U.S. Cl.
CPC ............. *A21D 15/02* (2013.01); *A21D 13/24* (2017.01); *A21D 13/28* (2017.01); *A21D 13/60* (2017.01); *A23G 3/343* (2013.01); *A23G 3/54* (2013.01)

(58) Field of Classification Search
None
See application file for complete search history.

(56) References Cited

U.S. PATENT DOCUMENTS

| | | |
|---|---|---|
| 3,669,688 A | 6/1972 | Thompson |
| 4,135,005 A | 1/1979 | Cheng |
| 4,146,652 A | 3/1979 | Kahn et al. |
| 4,431,682 A | 2/1984 | Gordon et al. |
| 5,102,680 A | 4/1992 | Glass et al. |
| 5,709,896 A | 1/1998 | Hartigan et al. |
| 6,368,645 B2 | 4/2002 | Huang |
| 6,565,909 B1 | 5/2003 | Huang et al. |
| 7,282,231 B2 | 10/2007 | Yamamoto et al. |
| 9,861,107 B2 | 1/2018 | Zhong et al. |
| 2009/0098256 A1 | 4/2009 | Stevens |
| 2010/0196553 A1 | 8/2010 | Satoh |

OTHER PUBLICATIONS

PCT Search Report and Written Opinion for PCT/US2013/056087, completed Jan. 22, 2014.

*Primary Examiner* — Nikki H. Dees
*Assistant Examiner* — Amber M Cox
(74) *Attorney, Agent, or Firm* — Barnes & Thornburg LLP

(57) ABSTRACT

The present invention is directed to compositions and methods for inhibiting bloom formation on frozen frosted bakery products, such as cake doughnuts and yeast doughnuts.

22 Claims, 3 Drawing Sheets

BLOOM RESISTANT FROZEN BAKERY PRODUCTS

CROSS REFERENCE TO RELATED APPLICATIONS

This application is a continuation application of U.S. application Ser. No. 14/423,324, filed on Feb. 23, 2015, which is a national stage entry under 35 U.S.C. § 371(b) of International Application No. PCT/US2013/056087, filed Aug. 22, 2013, which claims the benefit of priority under 35 U.S.C. § 119(e) to U.S. Provisional Patent Application Ser. No. 61/692,483, filed Aug. 23, 2012, the entire disclosures of all of which are expressly incorporated by reference herein.

BACKGROUND

Blooms on frosted bakery products, and in particular, frozen frosted bakery products appear as white eruptions on the surface of the frosting. While the blooms do not create any health risk or significantly influence the taste or texture of the bakery product, their appearance tends to make the product unappetizing. The invention described herein is directed to address this problem. In particular, the invention relates to methods and compositions for inhibiting bloom formation on frozen frosted bakery products. This inhibition enhances the commercial value of the bakery products by increasing the time it takes for blooming to occur and thus extends the product's shelf life.

The components used to make a glaze or frosting can include sugar, water, fat and other appropriate components. The frosting is applied to a bakery substrate which can be made from components such as flour, sugar, fat, water and other suitable components. One example of a bakery substrate is a doughnut. The bakery substrate with the frosting thereon, the bakery product, is then frozen for storage prior to its distribution. As indicated above, the frozen bakery product can form blooms which make it less appetizing and thus decrease its commercial value. Accordingly, compositions and methods for inhibiting bloom formation on frozen frosted bakery products are desirable.

SUMMARY OF THE INVENTION

This summary is provided to introduce concepts related to food products that are further described below in the detailed description. This summary is not intended to identify essential features of the claimed subject matter nor is it intended for use in determining or limiting the scope of the claimed subject matter.

Embodiments of the present invention can include a food product having a substrate made from flour, sugar, fat, and water. The food product may also include a frosting that includes sugar, fat and water. The frosting may be in contact with the substrate such as being disposed upon the substrate. The substrate and frosting may have the same or different water contents. Examples of the percent moisture content between the substrate and the frosting may be from about −6% to about 1.5%; from about 0% to about 1.3%; from about −4% to about 1.3%; from about 0% to about 1.25%; and from about −4% to about 1.25%. The food product may be a bakery product. The bakery product may be a yeast doughnut or a cake doughnut. The food product may be frozen. For example, a frozen yeast doughnut or a frozen cake doughnut. The frosting may include a bio-polymer, such as maltodextrin.

DETAILED DESCRIPTION OF THE INVENTION

Figure 1:
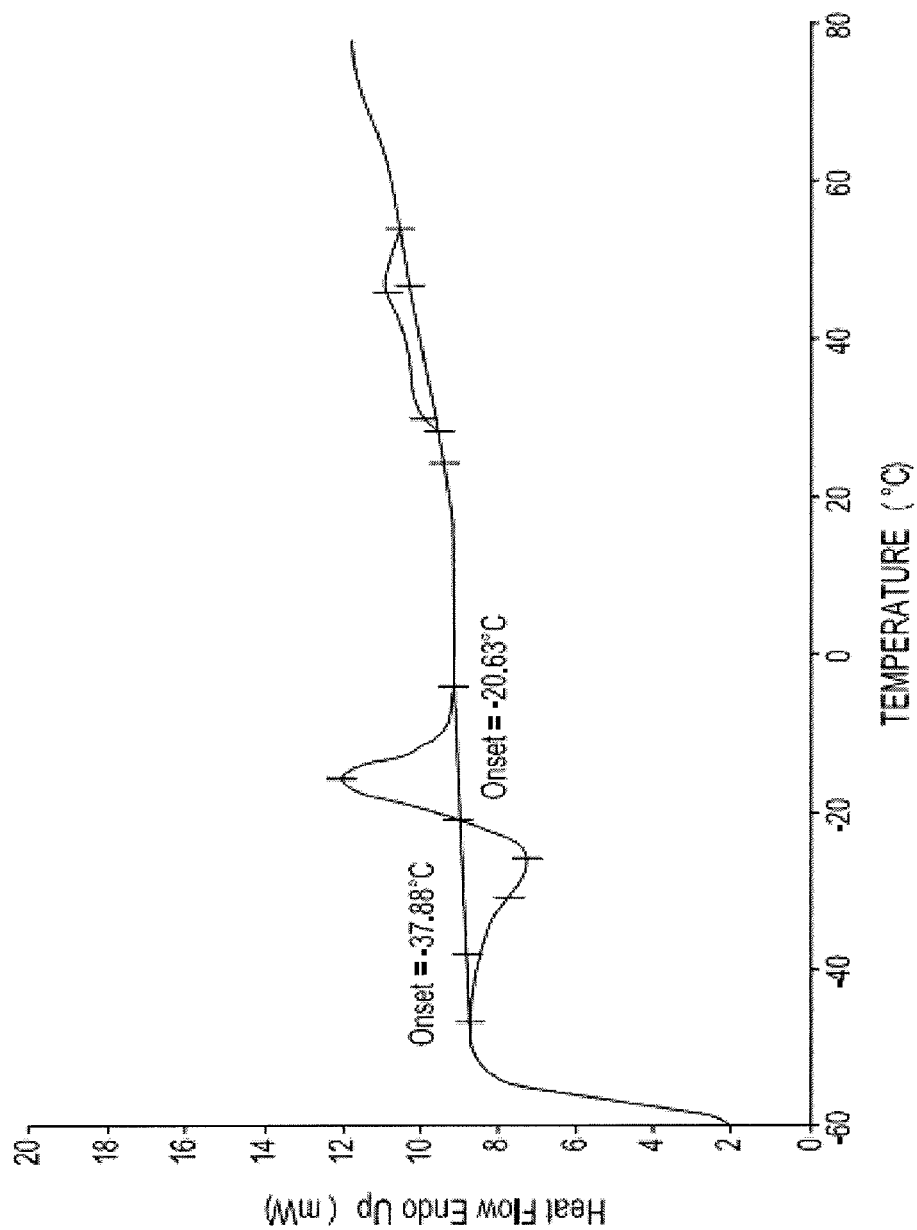
FIG. 1 is a DSC thermogram for basic frosting prepared by cooling at 10° C. per minute in a DSC calorimeter.

The present invention is directed to bloom resistant bakery products, such as, frozen frosted bakery products. In one aspect, the invention includes the incorporation of a moisture balance between the bakery substrate and the frosting. Although, the invention is susceptible to various modifications and alternative forms, specific embodiments will be described in detail herein. It should be appreciated, however, that there is no intent to limit the invention to the particular forms described, but on the contrary, the intention is to cover all modifications, equivalents, and alternatives falling within the spirit and scope of the invention.

The present invention may be used with any bakery product where blooming is a concern. For example, a frozen bakery products where a frosting is placed on a bakery substrate and the inhibition of sugar blooming would be advantageous. A bakery substrate, as used herein, is any substance that may include flour, sugar, water, and fat. Similarly, a glaze or frosting as used herein is a sugar-containing component that is disposed onto the bakery substrate. In one embodiment, the frosting is directly disposed onto the bakery substrate.

The bakery substrate with the frosting disposed thereon will result in one type of bakery product, although other components may be present in the bakery product. The bakery product can be edible as in the case of placing frosting onto a doughnut substrate to produce the bakery product. In addition, the invention disclosed herein can be utilized with a wide variety of bakery products. Other types of bakery substrates to which a frosting can be disposed thereon to produce a bakery product used in the present invention include, but are not limited to, cakes, cookies, brownies, muffins, cupcakes, breads, rolls, and pastries. Although the following detailed description is primarily directed to doughnuts, there is no intent to limit the invention to this particular bakery product.

Generally there are two basic types of doughnuts: yeast doughnuts and cake doughnuts. Typically the process for making cake doughnuts includes dropping the batter from a depositor directly into hot frying fat via a set of nozzles or plungers (Table 1A). The nozzles shape the batter as it passes therethrough. The doughnuts are then fried in the fry fat for about two minutes whereupon a conveyor carries them out of the vat to be frosted (Table 1A). After being frosted the doughnuts are cooled and then frozen and packaged for distribution.

One procedure for making yeast doughnuts includes using a dough mixer to develop the dough (Table 1B). Once developed, the dough is removed from the mixer and placed into the extruder. After extrusion, the dough is placed on another conveyor belt where a series of rollers flatten it into a sheet having the desired thickness. The sheet is then advanced to a rotating cylinder that cuts the dough into an appropriate shape of the substrate. Thereafter, a retractable arm drops the cut pieces of dough onto wire mesh trays. The mesh trays then transport the cut pieces into a proofer (Table 1B). The heat and humidity in the proofer makes the yeast dough rise. After the leavening process, the dough is fried for about two minutes (Table 1B). After frying the doughnut, it is passed through a curtain of frosting (e.g., glaze) to produce the final product. After being frosted, the doughnuts are cooled and then frozen and packaged for distribution.

As indicated above the present invention also relates to a method of producing a bakery substrate and frosting which is resistant to sugar bloom. Specifically the substrate and the frosting are formulated so as to balance the water potential between the two formulas. The resulting product is similar to current products in the market place with respect to color, taste and texture. A bakery substrate, such as a doughnut, is typically made from flour, sugars, fat, water and other suitable components. As discussed above, typically the doughnuts are frosted with frosting that may include sugar, water, fat and other suitable components. The application of the frosting to a bakery substrate when the product is going to be frozen has the disadvantage of producing bloom on the surface of the frosting when in frozen storage or frozen distribution. As discussed, the bloom on the doughnuts appears as a white eruption on the surface of the frosting. The bloom on the surface of the frosting is the result of the formation of sugar hydrates and is typically referred to as sugar bloom. Bloom may occur in many frosting systems, but is normally most noticeable in chocolate frostings.

As taught herein, the closer the percentage water content between the bakery substrate and the frosting the more resistant the bakery product is to bloom. Accordingly, the present invention relates to compositions and methods for producing a bakery substrate and frosting system which is resistant to bloom. As discussed in further detail below, the bakery substrate and the frosting are formulated to balance the water potential between the two formulas. The resulting product is similar to current products in the market place in color, taste, and texture, but is resistant to bloom.

Glass transition theory plays a role in bloom formation. Accordingly, a brief discussion of this theory is set forth prior to addressing a potential mechanism for sugar bloom formation and how the present invention inhibits the same. First, it should be understood that glass transition theory is applicable to help understand the physical properties of bio-polymer systems. This theory can also be utilized to help understand the physical state of solid systems made up of small molecular weight compounds such as sugars. This theory states that at low temperatures and low moistures, amorphous bio-polymer exist in their glassy state while at higher temperatures and higher moistures the bio-polymer are in their rubbery state.

In a typical doughnut manufacturing process, after frying the doughnuts they are frosted and cooled at ambient temperature to set the glaze or frosting, solidify fats, and to remove the rest of the heat. The frosted doughnuts are then frozen using one of two different freezing methods, slow freezing or quick freezing. Bakery products are slow frozen when they dwell for about 24 hours to about 48 hours in a static or case freezer set at temperatures ranging from about −10° C. to about −20° C. Contrarily, bakery products are quick frozen when they dwell for about 15 minutes to about 40 minutes in a blast freezer at temperatures ranging from about −17° C. to about −34° C. Here, bakery products were quick frozen at about −33° C. for about 37 minutes. The final frozen bakery products were then packaged and prepared for distribution.

During quick freezing, free water in the product is changed from a liquid to a solid state in the latent zone. Once the latent zone is complete it passes into the glassy state that has a glass transition temperature (Tg) below the freezing temperature. During frozen storage, the temperature is below the Tg and the bio-polymer is not mobile. Above the Tg, segmental mobility becomes possible and the bio-polymer undergoes a transition to a material having a different nature. During frozen storage, the doughnut is susceptible to freeze/thaw cycles which causes some of the water or bio-polymer agent to liquefy. The liquefied water makes smaller sugar crystals which migrate to larger sugar crystals to start forming clusters where it recrystallizes to a more stable physical form and produces bloom. As previously discussed, blooming does not create any health risks or significantly influence the taste or texture of the doughnut once it is thawed. The appearance of white eruptions of sugar bloom is, however, unappealing and tends to make the product appear unappetizing.

Described herein are bakery substrate/frosting combinations that can have an equalized moisture content that results in the inhibition of bloom formation. Some examples of the formulations which can be utilized in the present invention are set forth below in Tables 3, 6 and 7. In particular, the frosting formulation can include one or more of the following constituents; about 10% to about 40% by weight water; about 50% to 90% by weight sugars; about 0.5% to about 5% by weight frosting stabilizer; about 1% to about 6% by weight fat; about 0% to about 15% by weight of a bio-polymer, such as maltodextrin (Table 3). The frosting may have a glass transition temperature of about −10° C. to about −20° C. It should be appreciated that the substrate is frosted prior to freezing.

A frosting can be prepared from a mixture of water, granulated sugar, stabilizer, fat, and powdered sugar assembled as described below (Table 2). A basic frosting contains no added ingredients, such as bio-polymer, to retard bloom (Table 3). The soluble solids of the basic frosting can range from about 67% to about 87% by weight (Table 4). Compared to the basic frosting, another frosting formulation, Benchmark, has reduced sugar, increased fat content, and the addition of bio-polymer to help retard bloom (Table 3). The M100 frosting includes the same sugar content as the Benchmark frosting, but a reduced sugar content to help retard bloom (Table 3). In addition, the M100 frosting contains an increase in bio-polymer content, as compared to both basic and Benchmark frostings, and is prepared as described in Table 1, from a mixture of water, sugar, stabilizer, fat, maltodextrin and flavor (Table 3).

The water activity ($A_w$) of the Benchmark and the M100 frostings containing the bio-polymer range from 0.802-0.818; well below the maximum 0.85 $A_w$ parameter established by the FDA for shelf-safe bakery products (Table 4). The Benchmark and the M100 frostings with the bio-polymer also contain soluble solids which range from about 67% to about 87% by weight (Table 4). In addition, the viscosity of the Benchmark and the M100 frostings containing the bio-polymer is reduced, as compared to the viscosity of the basic frosting, which also reduces the amount of water absorption into the bakery substrate and therefore, retards bloom (Table 5).

The bakery substrate or yeast doughnut is formulated in two steps. First, the yeast doughnut substrate mix is prepared and can include one or more of the following: about 70% to about 87% by weight flour; about 4% to about 8% by weight sugars; about 5% to about 10% by weight fat; about 0.5% to about 2.5% by weight salt; about 0.5% to about 4% by weight dairy solids; and about 0.5% to about 4% by weight emulsifiers (Table 6A). Once the yeast doughnut mix is prepared, water and about 2% to about 4% yeast are added to constitute the yeast doughnut dough (Table 6B). Water added to the yeast doughnut mix is at about 30% to about 40% by weight (Table 6B) or about 20% to about 30% by weight or in another alternative about 24% to about 26% by weight. Finally, the yeast doughnut dough is processed, as described herein, to make frozen frosted yeast doughnut bakery products (Table 1B).

An alternative bakery substrate (e.g., cake doughnuts) is also formulated in two steps. First, the cake doughnut substrate mix is prepared and may include one or more of the following constituents; about 60% to about 80% by weight flour; about 2% to about 6% by weight fat; about 15% to about 35% by weight sugar; about 0.5% to about 2.5% by weight salt; about 0.5% to about 4% by weight egg yolk; about 0.5% to about 4% by weight leavenings; about 0.5% to about 4% by weight starch; about 0.5% to about 4% by weight emulsifiers; about 1% to about 4% dairy solids; about 0.2% to about 2% by weight flavor (Table 7A). Once the cake doughnut mix is prepared, water is added to constitute the cake doughnut batter (Table 7B). Water added to the cake doughnut batter is at about 29% to about 40% by weight (Table 7B) or in the alternative about 20% to about 24% by weight. Finally, the cake doughnut batter is processed, as described herein, to make frozen frosted cake doughnut bakery products (Table 1A).

TABLE 1

DIRECTIONS TO PREPARE BAKERY SUBSTRATES

| TABLE 1A | TABLE 1B |
| --- | --- |
| CAKE DOUGHNUTS | YEAST DOUGHNUTS |
| 1. Add cake doughnut mix and water to bowl. | 1. Add yeast doughnut mix, yeast, and water to bowl. |
| 2. Mix the composition from Step 1 for 1 minute low speed and 2 minutes medium speed. | 2. Mix the composition from Step 1 for 1 minute low speed and 10 minutes medium speed. |
| 3. Measure the batter temperature. | 3. Measure the dough temperature. |
| 4. Fry the batter at 180° C. for 60/60 seconds on each side. | 4. Proof the dough for 35 minutes. |
|  | 5. Fry the dough at 180° C. for 60/60 seconds on each side. |

TABLE 2

DIRECTIONS TO PREPARE FROSTINGS

1. Scale Water.
2. Scale granulated sugar and stabilizer. Pre-blend them.
3. Scale powdered sugar, maltodextrin, and flavor. Pre-blend them.
4. Scale shortening, hard fat flakes, and fondant.
5. Blend the composition created in Step 1 to the composition created in Step 2 until the sugar dissolves.
6. Heat until there is a rolling boil.
7. Add the composition created in Step 4 to the syrup and stir until all the ingredients are dissolved.
8. Mix in the "dual speed mixer" the composition from Step 3 with the final syrup obtained in Step 7 with torque in high power range for Steps 9 and 10.
9. Add half of the composition from Step 3 and mix at 1000 rpm for two minutes.
10. Add the rest of the composition from Step 3 and mix at 1400 rpm for two minutes.
11. Measure the soluble solids, water activity, viscosity, and temperature.

TABLE 3

FROSTING FORMULATIONS

| FORMULA INGREDIENTS | BENCHMARK (%) | M100 (%) | BASIC (%) | RANGE (%) |
| --- | --- | --- | --- | --- |
| WATER | 19.2% | 20.0% | 18.5% | 10.0-40.0% |
| SUGAR: GRANULATED, POWDERED, FONDANT | 69.8% | 60.6% | 77.2% | 50.0-90.0% |
| FROSTING STABILIZER | 2.2% | 2.4% | 2.5% | 0.5-5.0% |
| FAT: PLASTIC FLAKES AND ALL PURPOSE | 5.5% | 5.5% | 1.9% | 1.0-6.0% |
| BIO-POLYMER: MALTODEXTRIN | 2.8% | 11.0% | 0.0% | 0.0-15.0% |
| FLAVOR: VANILLA, BUTTER, LEMON | 0.6% | 0.5% | 0.0% | |
| TOTAL: | 100.0% | 100.0% | 100.0% | |

TABLE 4

FROSTING PARAMETERS

| FORMULAS | BENCHMARK | M100 | BASIC |
| --- | --- | --- | --- |
| WATER ACTIVITY ($A_w$) | 0.812-0.818 | 0.802-0.810 | 0.821-0.831 |
| SOLUBLE SOLIDS (%) | 77.0-78.0 | 76.5-77.5 | 80.5-81.5 |
| VISCOSITY (Pa · s) @ 35° C. | 24.0-30.0 | 22.0-27.0 | 40.0-50.0 |
| GLASS TEMPERATURE ($T_g$) | TOO LOW | −18° C. | |

TABLE 5

FROSTING VISCOSITY

| FORMULAS | TEMPERATURE (° C.) | VISCOSITY (Pa · s) |
| --- | --- | --- |
| BENCHMARK | 30 | 47.00 |
|  | 40 | 13.40 |
|  | 50 | 5.40 |
| M100 | 30 | 24.20 |
|  | 40 | 7.66 |
|  | 50 | 3.32 |
| BASIC | 30 | 88.00 |
|  | 40 | 8.25 |
|  | 50 | 6.00 |

TABLE 6

YEAST DOUGHNUT SUBSTRATE FORMULATION

| DESCRIPTION | PART (%) | RANGE (%) |
| --- | --- | --- |
| TABLE 6A. YEAST DOUGHNUT SUBSTRATE MIX | | |
| EMULSIFIERS: MONO-AND DIGLYCERIDES, SSL | 1.3% | 0.5-4.0% |
| LEAVENING ACIDS: SAPP 43, 40, 37, 28 | 0.6% | |
| SALT | 1.2% | 0.5-2.5% |
| FLOUR: HARD AND SOFT WHEAT | 82.0% | 70.0-87.0% |
| SUGAR: DEXTROSE | 4.9% | 4.0-8.0% |
| SOY FLOUR | 1.0% | |
| FLAVORS: VANILLA AND BUTTER | 0.1% | |
| FAT: SOY OIL | 5.7% | 5.0-10.0% |
| SODIUM BICARBONATE | 0.5% | |
| FD & C COLORS | 0.0% | |
| DAIRY SOLIDS | 0.7% | 0.5-4.0% |
| POTATO FLOUR | 2.0% | |

TABLE 6-continued

YEAST DOUGHNUT SUBSTRATE FORMULATION

| DESCRIPTION | PART (%) | RANGE (%) |
|---|---|---|
| YEAST DOUGHNUT MIX | 100.0% | |
| TABLE 6B. YEAST DOUGHNUT SUBSTRATE DOUGH | | |
| WATER | 33.5% | 20.0-40.0% |
| YEAST DOUGHNUT MIX | 64.4% | |
| YEAST | 2.1% | 2.0-4.0% |
| YEAST DOUGHNUT DOUGH | 100.0% | |

TABLE 7

CAKE DOUGHNUT SUBSTRATE FORMULATION

| DESCRIPTION | PART (%) | RANGE (%) |
|---|---|---|
| TABLE 7A. CAKE DOUGHNUT SUBSTRATE MIX | | |
| EMULSIFIERS: SOY LECITHIN, MONO- AND DIGLYCERIDES, PGME | 0.6% | 0.5-4.0% |
| LEAVENING ACIDS: SAPP 43, 40, 37, 28, BL60 | 1.2% | 0.5-4.0% |
| SALT | 1.0% | 0.5-2.5% |
| GRANULATED SUGAR | 25.4% | 15.0-35.0% |
| EGG YOLK SOLIDS | 1.0% | 0.5-4.0% |
| SOY FLOUR | 3.2% | |
| FLAVORS: VANILLA AND NUTMEG | 0.5% | 0.2-2.0% |
| FAT: SOY OIL | 3.6% | 2.0-6.0% |
| SODIUM BICARBONATE | 0.9% | |
| PREGEL STARCH | 0.8% | 0.5-4.0% |
| HYDROCOLLOIDS: GUAR, CMC | 0.1% | |
| FD & C COLORS | 0.0% | |
| FLOUR: HARD AND SOFT WHEAT | 60.1% | 60.0-80.0% |
| PRESERVATIVE: SODIUM PROPRIONATE | 0.1% | |
| DAIRY SOLIDS | 1.5% | 1.0-4.0% |
| CAKE DOUGHNUT MIX | 100.0% | |
| TABLE 7B. CAKE DOUGHNUT SUBSTRATE BATTER | | |
| WATER | 29.8% | 20.0-40.0% |
| CAKE DOUGHNUT MIX | 70.2% | |
| CAKE DOUGHNUT BATTER | 100.0% | |

A number of formulations for frosting and substrate are described above which can be combined to produce a bakery product having a desired range of percentage (%) differences in the moisture content of the substrate and the frosting. Some specific examples of percentage differences in moisture content between the bakery substrate and the frosting include from about 0% to about 8%, about 1% to about 7%, about 2% to about 6%, about 3% to about 5%, about 4%, about 1%, about 2%, about 3%, about 5%, about 6%, about 7%, about 8%; about 1% to about 8%, about 2% to about 8%, about 3% to about 8%, about 4% to about 8%, about 5% to about 8%, about 6% to about 8%, about 7% to about 8%, about 0% to about 7%, about 0% to about 6%, about 0% to about 5%, about 0% to about 4%, about 0% to about 3%, about 0% to about 2%, about 0% to about 1%. Other examples of a percentage difference in moisture content between the frosting and the substrate include about 2.6% and about 0.6%.

It should be understood that the water potential can flow from the substrate to the frosting and it will be positive. Also the water potential can flow from the frosting to the substrate and it will be negative. Accordingly, additional ranges include from about 0% to about 1% and from about −5% to about 0% respectively From about −6% to about 0%, about −6% to about 1%, about −5% to about 1%, about −4 to about 1%, about −3 to about 1%, about −2% to about 1%, about −1% to about 1%, about −1% to about 0%, about −6% to about −5%, about −5% to about −4%, about −4% to about −3%, about −3% to about −2%, about −2% to about −1%. In addition, it should be appreciated that the substrate water potential range can be from about 0% to about 1.3%. For example, about 0% to about 1.25%. In addition, the frosting's water potential range can be from about −4% to about 1.3%. For example, from about −4% to about 1.25%.

EXAMPLES

In the following examples the doughnuts were fried utilizing a frying shortening where the temperature was about 170° C. to about 195° C. The frostings were examined by Differential Scanning Calorimeter methods (DSC). DSC profiles essentially plot the melting and the crystallization profile of a frosting system by plotting the energy against the temperature of the test sample. The profiles have one melting peak and one crystallization peak of saturated solution. The onset temperature is where the saturated solution in the frosting starts solidifying. Changes in the peaks of subsequent DSC profiles are indicative of changes of the physical state of solid systems. As discussed above the occurrence of sugar bloom on the surface of the frosting appears as a white eruption. The bloom rate can be measured using a timeline inspection. The doughnuts were inspected in the freezer according to the timeline and the results recorded.

Example 1

Figure 3:
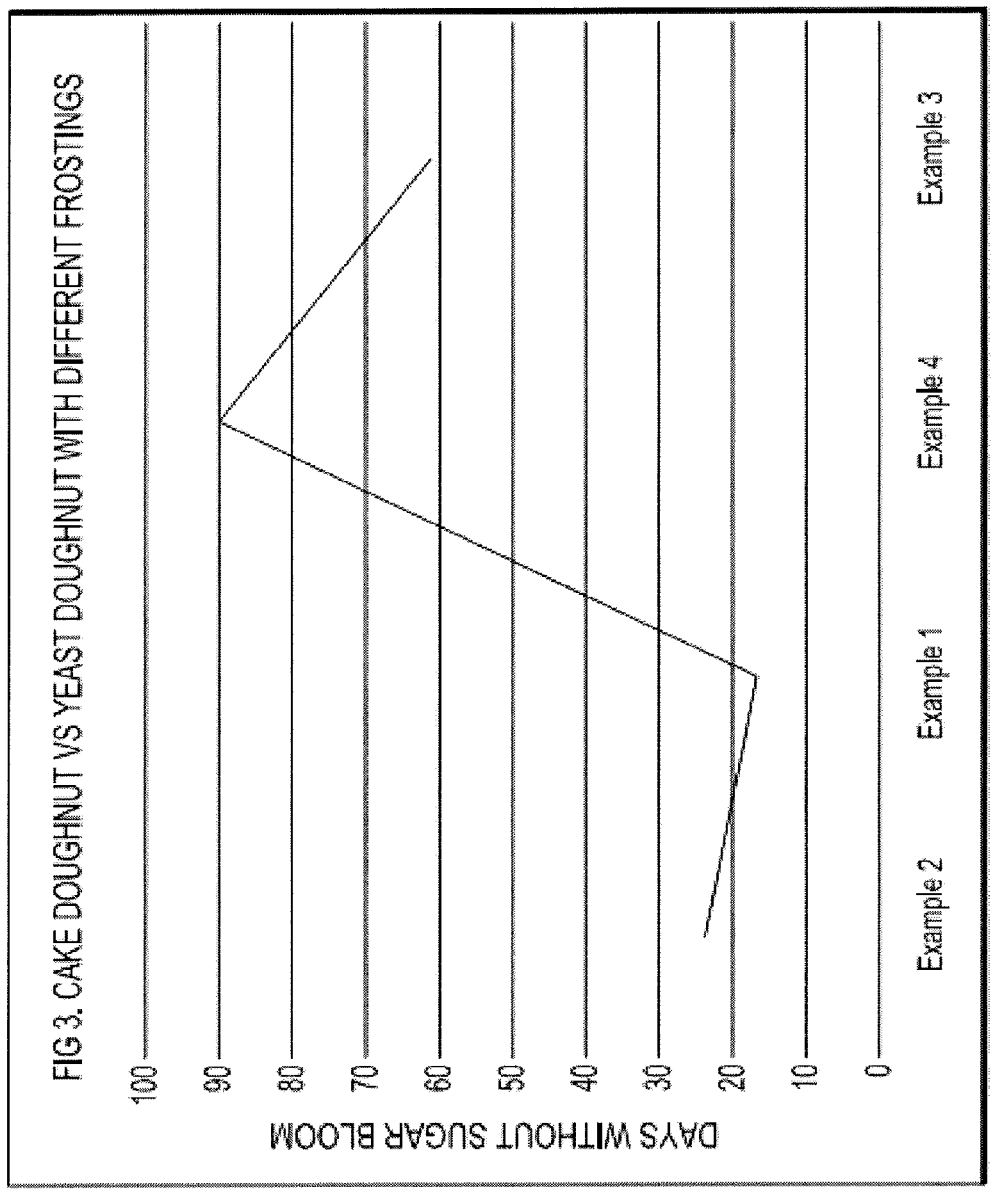
FIG. 3 illustrates the number of days the bakery products go without bloom, the bakery products being made with the procedure disclosed in Examples 1-4.

This example demonstrates the instability of higher water potential and the shorter time for the frosting to show sugar bloom. Several samples of yeast doughnuts were prepared and frosted with the basic frosting and quick frozen to be stored inside a holding freezer. The evidence of sugar bloom was established visually by observing the formation of white crystals on the surface of the frosting. The DSC thermograms were prepared by cooling at 10° C. per minute in a DSC calorimeter. The thermogram is recorded in FIG. 1. As shown, the saturated solution in the basic frosting initially starts solidifying at about −20.63° C. The moisture content in the yeast doughnut bakery substrate was about 24.1% and the moisture content in the basic frosting was about 19.5% with a difference in moisture content or water potential of about 4.6%. The sugar eruptions or sugar bloom were visible after 17 days inside the holding freezer as shown in FIG. 3.

Example 2

This example demonstrates the instability of higher water potential and the shorter time for the frosting to show sugar bloom. Several samples of cake doughnuts were prepared and frosted with the basic frosting. The doughnuts were then quick frozen and stored inside a holding freezer. The evidence of bloom was established visually by observing the formation of white crystals on the surface of the frosting. The DSC thermograms were prepared by cooling at 10° C. per minute in a DSC calorimeter. The thermogram is shown in FIG. 1. As shown, the saturated solution in the basic frosting initially starts solidifying at about −20.63° C. The moisture content in the cake doughnut bakery substrate was about 20.85% and the moisture content in the basic frosting was about 19.5% with a difference in moisture content or water potential of about 1.35%. The sugar eruptions or sugar bloom were visible after 24 days inside the holding freezer as shown in FIG. 3.

Example 3

Figure 2:
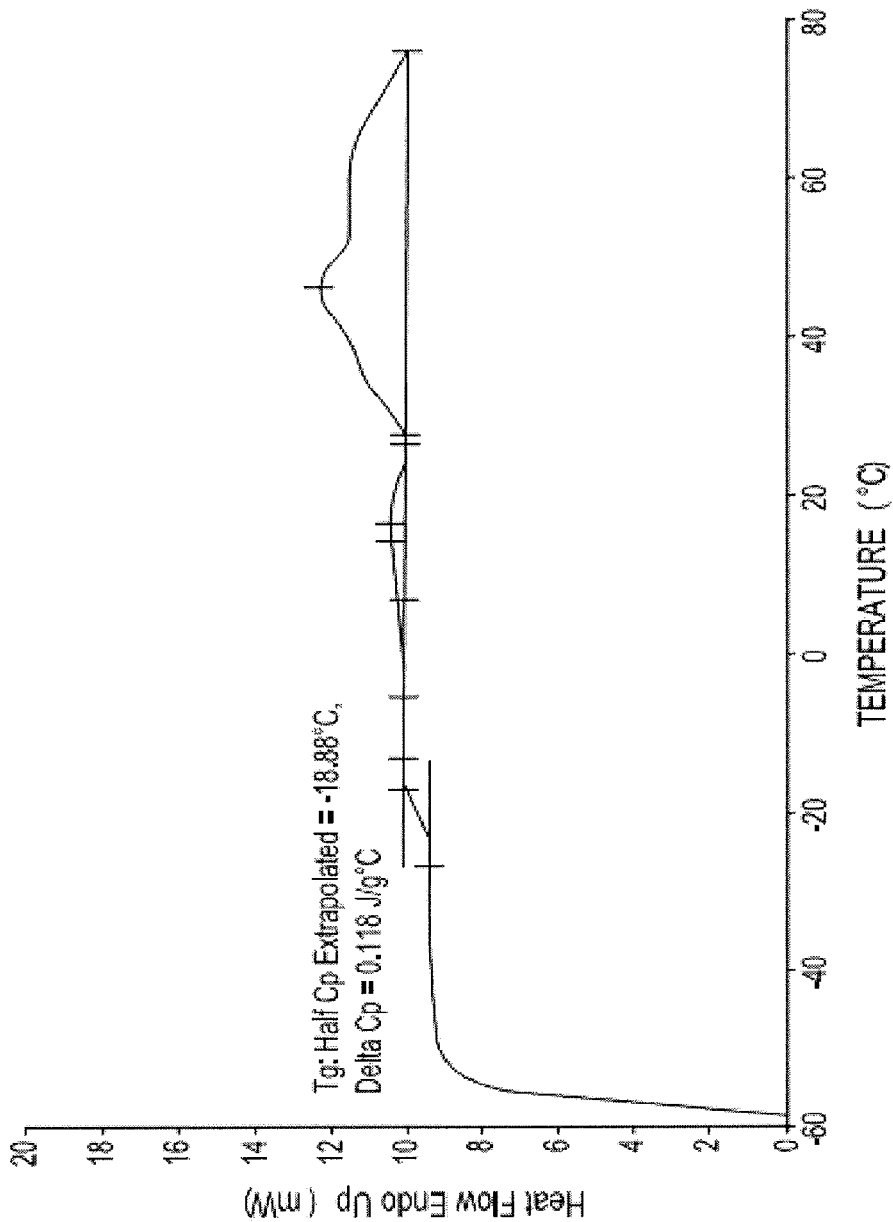
FIG. 2 is a DSC thermogram for basic frosting containing the bio-polymer maltodextrin M-100 utilized to increase the glass transition temperature.

This example demonstrates the stability of lower water potential and the longer time for the frosting to show sugar bloom. Several samples of yeast doughnuts were prepared and frosted with a frosting containing bio-polymer. The doughnuts were quick frozen to be stored inside a holding freezer. The evidence of bloom was established visually by observing the formation of white eruptions on the surface of the frosting. The DSC thermograms were prepared by cooling at 10° C. per minute in a DSC calorimeter. The thermogram is shown in FIG. 2. As shown, the saturated solution in the frosting with bio-polymer showed a glass transition temperature (Tg) at about −18.88° C. The moisture content in the yeast doughnut bakery substrate was about 24.1% and the moisture content in the basic frosting containing polymers was about 23.5% with a difference in moisture content or water potential of about 0.6%. The sugar eruptions or sugar bloom were visible after 61 days inside the holding freezer as shown in FIG. 3.

Example 4

This example demonstrates the stability of lower water potential and the longer time for the frosting to show sugar bloom. Several samples of cake doughnuts were prepared and frosted with a frosting containing bio-polymer. The doughnuts were quick frozen and stored inside a holding freezer. The evidence of bloom was established visually by observing the formation of white eruptions on the surface of the frosting. The DSC thermograms were prepared by cooling at 10° C. per minute in a DSC calorimeter. The thermogram is shown in FIG. 2. As shown, the saturated solution in the frosting containing polymers showed a glass transition temperature (Tg) at about −18.88° C. The moisture content in the cake doughnut bakery substrate was about 20.85% and the moisture content in the basic frosting containing polymers was about 23.5% with a difference in moisture content or water potential of about −2.65%. The sugar eruptions or sugar bloom were visible after 90 days inside the holding freezer as shown in FIG. 3.

While certain embodiments of the present invention have been described and/or exemplified above, it is contemplated that considerable variation and modification thereof are possible. Accordingly, the present invention is not limited to the particular embodiments described and/or exemplified herein.

What is claimed is:

1. A doughnut frosting resistant to sugar bloom, consisting essentially of:
   sugar, fat, water, and stabilizer,
   at least 2.8 wt % to about 15 wt % maltodextrin,
   a water activity that is at least 0.802, and
   a viscosity of about 22 Pascal-second to about 27 Pascal-second,
   wherein when the doughnut frosting is in contact with a doughnut, the percent difference in moisture content between the doughnut and the doughnut frosting is from about −6% to about 1.5% and initial sugar bloom does not occur on the doughnut until after 61 days.

2. The doughnut frosting of claim 1, wherein the doughnut is a cake doughnut and the initial sugar bloom does not occur on the cake doughnut until after 90 days.

3. The doughnut frosting of claim 1, wherein the doughnut is a yeast doughnut and the initial sugar bloom does not occur on the yeast doughnut until after 61 days.

4. The doughnut frosting of claim 1, wherein the doughnut is frozen.

5. The doughnut frosting of claim 1, wherein the water activity of the frosting ranges from 0.802 to 0.818.

6. The doughnut frosting of claim 1, wherein the maltodextrin comprises from about 2.8 wt % to about 11 wt % of the frosting.

7. A doughnut frosting resistant to sugar bloom, consisting essentially of:
   sugar, fat, water, and stabilizer,
   at least 2.8 wt % to about 15 wt % maltodextrin,
   a water activity that is at least 0.802,
   and a viscosity of about 22 Pascal-second to about 27 Pascal-second,
   wherein when the doughnut frosting is in contact with a doughnut, the percent difference in moisture content between the doughnut and the doughnut frosting is from about −4% to about 1% and initial sugar bloom does not occur on the doughnut until after 61 days.

8. The doughnut frosting of claim 7, wherein the water activity of the frosting ranges from 0.802 to 0.818.

9. The doughnut frosting of claim 7, wherein the maltodextrin comprises from about 2.8 wt % to about 11 wt % of the doughnut frosting.

10. The doughnut frosting of claim 7, wherein the doughnut is a frozen doughnut.

11. The doughnut frosting of claim 10, wherein the frozen doughnut is a frozen yeast doughnut and the initial sugar bloom does not occur on the frozen yeast doughnut until after 61 days.

12. The doughnut frosting of claim 10, wherein the frozen doughnut is a frozen cake doughnut and the initial sugar bloom does not occur on the frozen cake doughnut until after 90 days.

13. A frozen doughnut frosting resistant to sugar bloom, consisting essentially of:
   sugar, fat, water, and stabilizer,
   at least 2.8 wt % to about 15 wt % maltodextrin,
   a water activity that is at least 0.802, and
   a viscosity of about 22 Pascal-second to about 27 Pascal-second,
   wherein when the frozen doughnut frosting is disposed onto a frozen doughnut, the percent difference in moisture content between the frozen doughnut and the frozen doughnut frosting is from about −3% to about 1.5% and initial sugar bloom does not occur on the frozen doughnut until after 61 days.

14. The frozen doughnut frosting of claim 13, wherein the frozen doughnut is a frozen yeast doughnut and the initial sugar bloom does not occur on the frozen yeast doughnut until after 61 days.

15. The frozen doughnut frosting of claim 13, wherein the frozen doughnut is a frozen cake doughnut and the initial sugar bloom does not occur on the frozen cake doughnut until after 90 days.

16. The frozen doughnut frosting of claim 13, wherein the water activity of the frozen doughnut frosting ranges from 0.802 to 0.818.

17. The frozen doughnut frosting of claim 13, wherein the maltodextrin comprises from about 2.8 wt % to about 11 wt % of the frozen doughnut frosting.

18. A frozen doughnut frosting resistant to sugar bloom, consisting essentially of:
   sugar, fat, water, and stabilizer,
   at least 2.8 wt % to about 15 wt % maltodextrin,
   a water activity that is at least 0.802, and a viscosity of about 22 Pascal-second to about 27 Pascal-second, wherein when the frozen doughnut frosting is in contact with a frozen doughnut, the percent difference in moisture content between the frozen doughnut and the frozen doughnut frosting is from about −4% to about 1.3% and initial sugar bloom does not occur on the frozen doughnut until after 61 days.

19. The frozen doughnut frosting of claim 18, wherein the frozen doughnut is a frozen yeast doughnut and the initial sugar bloom does not occur on the frozen yeast doughnut until after 61 days.

20. The frozen doughnut frosting of claim 18, wherein the frozen doughnut is a frozen cake doughnut and the initial sugar bloom does not occur on the frozen cake doughnut until after 90 days.

21. The frozen doughnut frosting of claim 18, wherein the water activity of the frozen doughnut frosting ranges from 0.802 to 0.818.

22. The frozen doughnut frosting of claim 18, wherein the maltodextrin comprises from about 2.8 wt % to about 11 wt % of the frozen doughnut frosting.

\* \* \* \* \*